United States Patent
Zhang

(10) Patent No.: US 10,486,200 B1
(45) Date of Patent: Nov. 26, 2019

(54) WORKPIECE CLEANING DEVICE

(71) Applicant: Yanghua Wu, Pujiang County (CN)

(72) Inventor: Bo Zhang, Yuhuan (CN)

(73) Assignee: Yanghua Wu, Pujiang County, Zhejiang Province (CN)

(*) Notice: Subject to any disclaimer, the term of this patent is extended or adjusted under 35 U.S.C. 154(b) by 0 days.

(21) Appl. No.: 16/236,360

(22) Filed: Dec. 29, 2018

(30) Foreign Application Priority Data

Jun. 20, 2018 (CN) .................. 2018 1 06370320

(51) Int. Cl.

| B08B 3/02 | (2006.01) |
|---|---|
| F16H 19/04 | (2006.01) |
| F16H 37/02 | (2006.01) |
| F16H 1/22 | (2006.01) |
| F16H 7/02 | (2006.01) |
| F16H 21/18 | (2006.01) |

(52) U.S. Cl.
CPC .............. *B08B 3/024* (2013.01); *F16H 1/22* (2013.01); *F16H 7/02* (2013.01); *F16H 19/043* (2013.01); *F16H 21/18* (2013.01); *F16H 37/02* (2013.01)

(58) Field of Classification Search
None
See application file for complete search history.

(56) References Cited

FOREIGN PATENT DOCUMENTS

| CN | 1608747 | 4/2005 |
|---|---|---|
| CN | 2902487 | 5/2007 |
| CN | 104096653 | 10/2014 |
| CN | 104338701 | 2/2015 |
| CN | 104550161 | 4/2015 |
| CN | 104096653 | 11/2017 |

OTHER PUBLICATIONS

First Office Action on for Chinese Counterpart Application 201810637032.0 dated Nov. 16, 2018.

*Primary Examiner* — Rita P Adhlakha

(57) ABSTRACT

This invention discloses a workpiece cleaning device, comprising an all-in box, a delivery device arranged in the all-in box, a cleaning chamber arranged in all-in box, wherein the front side of the cleaning chamber is provided with a water-supply cavity, and the rear side of the cleaning chamber is provided with a first transmission cavity. As the delivery device is arranged in the assembly line, first sprinklers above and below the workpiece in cleaning chamber may cyclically swing to clean the upper surface and the lower surface of the workpiece within a certain range of angles, and second sprinklers at the front and back side of the workpiece may move from one side to the other side to clean the front and back surfaces of the workpiece, which may clean the workpiece totally and rapidly.

4 Claims, 3 Drawing Sheets

US 10,486,200 B1

WORKPIECE CLEANING DEVICE

CROSS-REFERENCES TO RELATED APPLICATIONS

The present application claims priority from Chinese application No. 2018106370320 filed on Jun. 20, 2018 which is hereby incorporated by reference in its entirety.

TECHNICAL FIELD

The invention relates to the technical field of industrial machining, in particular to a workpiece cleaning device.

BACKGROUND OF THE INVENTION

In the industrial production, the workpiece is often put into a cleaning pool to be cleaned by manpower in traditional operation, the process of which is tedious, and the labor intensity is large, and it is difficult to realize rapid cleaning, which has major defects and needs to be improved.

BRIEF SUMMARY OF THE INVENTION

A workpiece cleaning device is provided by the invention so as to overcome the detects existing in the above-mentioned techniques.

A workpiece cleaning device of this invention comprises an all-in box, a delivery device arranged in said all-in box, wherein said all-in box is internally provided with a cleaning chamber penetrating from one side to the other side, and the front side of said cleaning chamber is provided with a water-supply cavity, and the rear side of said cleaning chamber is provided with a first transmission cavity, and the front and rear inner walls of said cleaning chamber are respectively provided with sliding chutes which are up and down symmetrical and extend towards two ends, and the front and rear inner walls of said cleaning chamber are symmetrically provided with sliding boxes which are in sliding fit connection with said sliding chutes; wherein gear cavities which are respectively close to the front and rear inner walls of said cleaning chamber are arranged in said sliding box, and the upper and lower end walls of gear cavities are provided with racks, wherein storage cavities are arranged in said gear cavities and away from the front and rear inner walls of said cleaning chamber, wherein the top walls of storage cavities are provided with first through holes penetrating up and down; discharging tubes which are up and down symmetrical and are in rotational engagement with the two inner walls of said cleaning chamber arranged in said cleaning chamber, wherein the front end of said discharging tube extends into said water-supply cavity; second gearings up and down symmetrically disposed on the front end wall of said first transmission cavity, wherein said second gearings comprise second transmission box bodies, which are internally provided with second transmission cavities; wherein the rear ends of said discharging tubes extend into said second transmission cavities, and the outer sides of the rear end faces of said discharging tubes are fixedly provided with oscillating rods, the rear ends of which are fixedly connected to rocker mechanisms which are located on the bottom walls of said second transmission cavities; first transmission shafts which are up and down symmetrical and extend towards front and back arranged in said first transmission cavity, wherein the extending end of the front end of said first transmission shaft extends into said second transmission cavity and is rotationally connected to said rocker mechanism, and the extending end of the rear end of said first transmission shaft is in rotational engagement with the rear end wall of said first transmission cavity, wherein said rocker mechanism comprises a frame, one side of which is provided with a driving rocker, one end of which is rotationally connected to said first transmission shaft, wherein the other end of said driving rocker is rotationally connected with one end of a first driven rocker, the turning of which is rotationally connected to one end of a second driven rocker, wherein the other end of said first driven rocker is rotationally connected with one end of a third driven rocker, and the other end of said second driven rocker is rotationally connected in said frame, and the other end of said third driven rocker is rotationally connected in the middle end of a fourth driven rocker which is rotationally connected to the other side of said frame, wherein the front top of said third driven rocker is fixedly connected to said oscillating rod; first driven gears which are fixedly connected to said first transmission shafts up and down symmetrically arranged in said first transmission cavity, wherein said first driven gear engages with a driving gear which is in power connection with a first motor which is on the rear wall of said first transmission cavity; a second transmission shaft fixedly connected to the center of front end of said driving gear, wherein said second transmission shaft is rotationally connected to the front wall of said first transmission cavity and penetrates into said gear cavity and is fixedly connected to a rotating plate, the outer circle of which is fixedly connected with a sector gear which is matched with said racks; a second driven gear which is located in the front of the lower said first driven gear arranged in said first transmission cavity, wherein said second driven gear is fixedly connected to said first transmission shaft, wherein the lower side of said second driven gear is provided with a third driven gear which is meshed with said second driven gear, wherein the center of the front side of said third driven gear is fixedly connected with a third transmission shaft which penetrates through and is rotationally connected to the front and rear inner walls of said cleaning chamber; wherein the front end of said third transmission shaft extends into said water-supply cavity and is fixedly connected to a first pulley, the upper side of which is connected to a second transmission pulley through a first belt, wherein the center of the rear side of said second transmission pulley is fixedly connected with a fourth transmission shaft which penetrates through and is rotationally connected to the rear wall of said water-supply cavity, wherein the rear end of said fourth transmission shaft extends into said gear cavity and is fixedly connected to said rotating plate.

For further technical proposals, said delivery device comprises a driving pulley which is connected to a second motor which is arranged on the rear side of said driving pulley, one side of which is provided with a driven pulley which is connected to said driving pulley through a second belt.

For further technical proposals, said discharging tube is internally provided with a cavity, the front end of which is communicated with said discharging tube, wherein three first sprinklers penetrating through the inner wall of the front side of said cavity are evenly distributed in the middle section of said cavity, wherein the bottom end face of the upper said discharging tube is provided with second through holes which are front and back symmetrical and communicated with the external, and said second through holes are connected to said first through holes through water adding flexible pipes; the front wall of said water-supply cavity is fixedly provided with a booster pump, wherein one end wall of said water-supply cavity is provided with a pipe hole penetrating towards two sides, wherein said pipe hole is internally provided with an inlet tube, two ends of which are respectively communicated with the external and said booster pump. wherein said cavity is connected with said booster pump through a water-supply flexible pipe.

For further technical proposals, three second sprinklers which penetrate the front and back of the inner walls are evenly formed on the inner walls of two said storage cavities, close to each other.

The benefits of the invention are as follows:

As the delivery device can be arranged in the assembly line when the device is installed, the first sprinklers above and below the workpiece in cleaning chamber may cyclically swing to clean the upper surface and the lower surface of the workpiece within a certain range of angles, and the second sprinklers at the front and back side of the workpiece may move from one side to the other side to clean the front and back surfaces of the workpiece, which may clean the workpiece totally and rapidly, so that the workpiece machining time and the labor force are both saved.

In operation, said delivery device delivers a workpiece into said cleaning chamber, and said booster pump conveys pressurized water to said inlet tube and the water is spayed out through said first sprinkler; said first motor drives said driving gear to rotate to drive said first driven gear to rotate, and said first driven gear drives said first transmission shaft to rotate to drive said driving rocker to rotate; the rotation of said driving rocker in the rocker mechanism converts to the reciprocating swing motion at 120 degrees of said third driven rocker, which drives said oscillating rod to swing to and fro at 120 degrees, which drives said discharging tube to swing to and fro at 120 degrees, so that said first sprinkler sprays water to and fro at 120 degrees left and right, thereby cleaning the upper surface of the workpiece, which improves the efficiency.

Meanwhile, the water in said inlet tube flows into said storage cavity and is sprayed out through the second sprinkler; said driving gear rotates to drive said second transmission shaft to rotate to drive said rotating plate and said sector gear to rotate, and said sector gear is rotated to drive said sliding box in the rear side to slide towards two ends through meshing transmission with the racks on the upper and lower walls of said gear cavity; Said first transmission shaft rotates to drive said second driven gear to rotate to drive said third driven gear to rotate, and said third driven gear rotates to drive said third transmission shaft to rotate; said third transmission shaft rotates to drive said first transmission pulley to rotate to drive said second transmission pulley to rotate through a first belt, which drives said fourth transmission shaft to rotate; Said first transmission shaft drives said rotating plate and said sector gear to rotate, after said sector gear rotates, said sector gear drives the front said sliding box to slide towards two sides through meshing transmission with said racks, thereby cleaning the front and rear surfaces of the workpiece, which makes the workpiece cleaned in a short time.

This invention has a simple structure and is easy and convenient to use as the delivery device may be arranged in the assembly line, and the first sprinklers above and below the workpiece in cleaning chamber may cyclically swing to clean the upper surface and the lower surface of the workpiece within a certain range of angles, and the second sprinklers at the front and back side of the workpiece may move from one side to the other side to clean the front and back surfaces of the workpiece, which may clean the workpiece totally and rapidly, so that the workpiece machining time and the labor force are both saved, and the machining is more automatic.

BRIEF DESCRIPTION OF THE DRAWINGS

For better explain the technical proposal in the present invention embodiments or the prior art, the drawings to be used in the description of the embodiments or the prior art will be briefly described below. Obviously, the drawings in the following description are only some embodiments of the present invention. For those common technicians in this field, other drawings may also be obtained based on these drawings without any creative work.

DETAILED DESCRIPTION OF THE INVENTION

All the features disclosed in this specification, or steps in all methods or processes disclosed, may be combined in any manner except mutually exclusive features and/or steps.

Any feature disclosed in this specification, including any additional claims, abstract and drawings, may be replaced with other equivalent or alternative features, unless specifically recited, that is, unless specifically stated, each feature is only one example of a series of equivalent or similar features.

Figure 1:
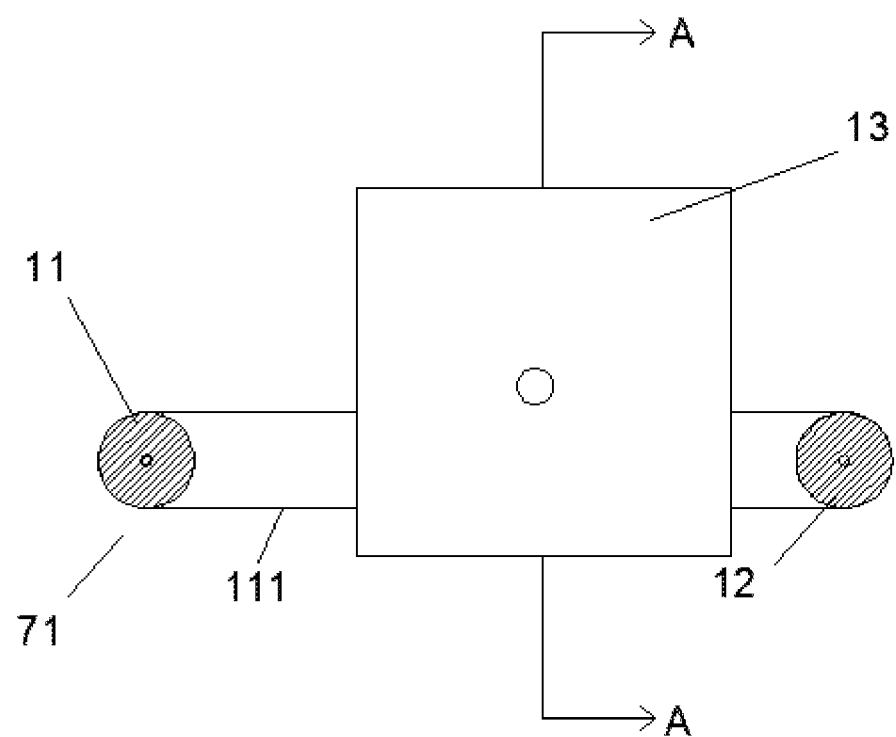
FIG. 1 is the front view of the workpiece cleaning device in this invention.
Figure 2:
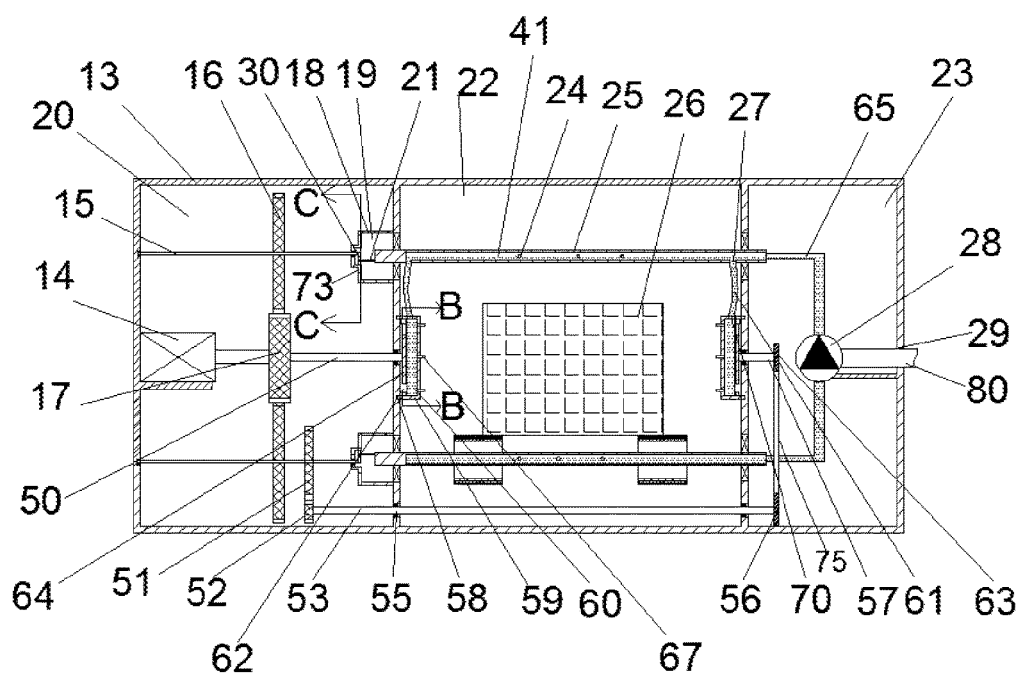
FIG. 2 is a schematic structural diagram of A in FIG. 1.
Figure 3:
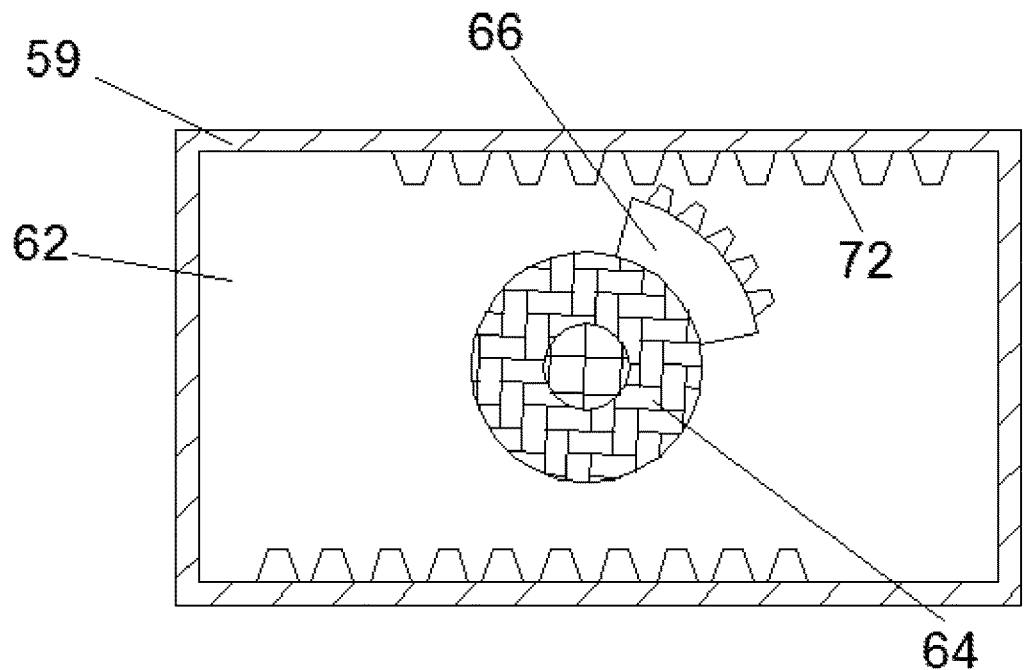
FIG. 3 is a schematic structural diagram of B in FIG. 2.
Figure 4:
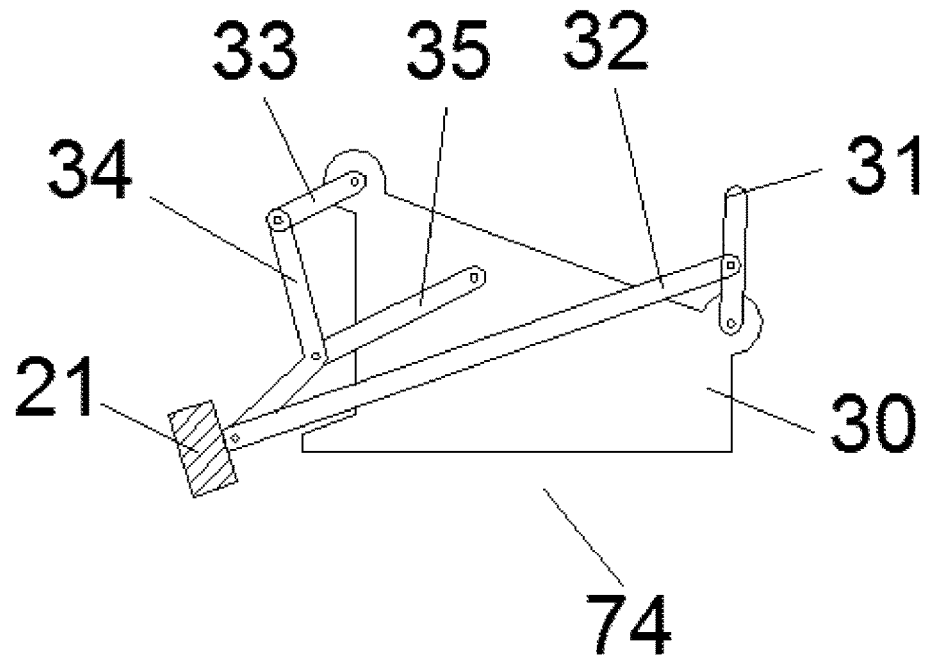
FIG. 4 is a schematic structural diagram of C in FIG. 2.

Referring to FIG. 1 to FIG. 4, a workpiece cleaning device of this invention comprises an all-in box 13, a delivery device 71 arranged in said all-in box 13, wherein said all-in box 13 is internally provided with a cleaning chamber 22 penetrating from one side to the other side, and the front side of said cleaning chamber 22 is provided with a water-supply cavity 23, and the rear side of said cleaning chamber 22 is provided with a first transmission cavity 20, and the front and rear inner walls of said cleaning chamber 22 are respectively provided with sliding chutes 58 which are up and down symmetrical and extend towards two ends, and the front and rear inner walls of said cleaning chamber 22 are symmetrically provided with sliding boxes 59 which are in sliding fit connection with said sliding chutes 58; wherein gear cavities 62 which are respectively close to the front and rear inner walls of said cleaning chamber 22 are arranged in said sliding box 59, and the upper and lower end walls of said gear cavities 62 are provided with racks 72, wherein storage cavities 60 are arranged in said gear cavities 62 and away from the front and rear inner walls of cleaning chamber 22 , wherein the top walls of storage cavities 60 are provided with first through holes 70 penetrating up and down; discharging tubes 25 which are up and down symmetrical and are in rotational engagement with the two inner walls of said cleaning chamber 22 arranged in said cleaning chamber 22, wherein the front end of said discharging tube 25 extends into said water-supply cavity 23; second gearings 73 up and down symmetrically disposed on the front end wall of said first transmission cavity 20, wherein said second gearings 73 comprise second transmission box bodies 18, which are internally provided with second transmission cavities 19; wherein the rear ends of said discharging tubes 25 extend into said second transmission cavity 19, and the outer sides of the rear end faces of said discharging tubes 25 are fixedly provided with oscillating rods 21, the rear end of which are fixedly connected to rocker mechanisms 74 which are located on the bottom walls of said second transmission cavities 19; first transmission shafts 15 which are up and down symmetrical and extend towards front and back arranged in said first transmission cavity 20, wherein the extending end of the front end of said first transmission shaft 15 extends into said second transmission cavity 19 and is rotationally connected to said rocker mechanism 74, and the extending end of the rear end of said first transmission shaft 15 is in rotational engagement with the rear end wall of said first transmission cavity 20, wherein said rocker mechanism 74 comprises a frame 30, one side of which is provided with a driving rocker 33, one end of which is rotationally connected to said first transmission shaft 15, wherein the other end of said driving rocker 33 is rotationally connected with one end of a first driven rocker 34, the turning of which is rotationally connected to one end of a second driven rocker 35, wherein the other end of said first driven rocker 34 is rotationally connected with one end of a third driven rocker 32, and the other end of said second driven rocker 35 is rotationally connected in said frame 30, and the other end of said third driven rocker 32 is rotationally connected in the middle end of a fourth driven rocker 31 which is rotationally connected to the other side of said frame 30, wherein the front top of said third driven rocker 32 is fixedly connected to said oscillating rod 21; first driven gears 16 which are fixedly connected to said first transmission shafts 15 up and down symmetrically arranged in said first transmission cavity 20, wherein said first driven gear 16 engages with a driving gear 17 which is in power connection with a first motor 14 which is on the rear wall of said first transmission cavity 20; a second transmission shaft 50 fixedly connected to the center of front end of said driving gear 17, wherein said second transmission shaft 50 is rotationally connected to the front wall of said first transmission cavity 20 and penetrates into said gear cavity 62 and is fixedly connected to a rotating plate 64, the outer circle of which is fixedly connected with a sector gear 66 which is matched with said racks 72; a second driven gear 51 which is located in the front of the lower said first driven gear 16 arranged in said first transmission cavity 20, wherein said second driven gear 51 is fixedly connected to said first transmission shaft 15, wherein the lower side of said second driven gear 51 is provided with a third driven gear 52 which is meshed with said second driven gear 51, wherein the center of the front side of said third driven gear 52 is fixedly connected with a third transmission shaft 53 which penetrates through and is rotationally connected to the front and rear inner walls of said cleaning chamber 22; wherein the front end of said third transmission shaft 53 extends into said water-supply cavity 23 and is fixedly connected to a first pulley 56, the upper side of which is connected to a second transmission pulley 63 through a first belt 75, wherein the center of the rear side of said second transmission pulley 63 is fixedly connected with a fourth transmission shaft 57 which penetrates through and is rotationally connected to the rear wall of said water-supply cavity 23, wherein the rear end of said fourth transmission shaft 57 extends into said gear cavity 62 and is fixedly connected to said rotating plate 64.

Beneficially or as an embodiment, wherein said delivery device 71 comprises a driving pulley 11 which is connected to a second motor which is arranged on the rear side of said driving pulley 11, one side of which is provided with a driven pulley 12 which is connected to said driving pulley 11 through a second belt 111.

Beneficially or as an embodiment, wherein said discharging tube 25 is internally provided with a cavity 41, the front end of which is communicated with said discharging tube 25, wherein three first sprinklers 24 penetrating through the inner wall of the front side of said cavity 41 are evenly distributed in the middle section of said cavity 41, wherein the bottom end face of the upper said discharging tube 25 is provided with second through holes 27 which are front and back symmetrical and communicated with the external, and said second through holes 27 are connected to said first through holes 70 through water adding flexible pipes 61; the front wall of said water-supply cavity 23 is fixedly provided with a booster pump 28, wherein one end wall of said water-supply cavity 23 is provided with a pipe hole 29 penetrating towards two sides, wherein said pipe hole is internally provided with an inlet tube 80, two ends of which are respectively communicated with the external and said booster pump 28, wherein said cavity 41 is connected with said booster pump 28 through a water-supply flexible pipe 65.

Beneficially or as an embodiment, wherein three second sprinklers 67 which penetrate the front and back of the inner walls are evenly formed on the inner walls of two said storage cavities 60, close to each other.

When the device is in an initial state, said first motor 14, said booster pump 28 and said delivery device 71 are in a starting state.

The device is installed on a production line, and said inlet tube 80 is connected with the tap water pipeline.

In operation, said delivery device 71 delivers a workpiece 26 into said cleaning chamber 22, and said booster pump 28 conveys pressurized water to said inlet tube 80 and the water is sprayed out through said first sprinkler 24; said first motor 14 drives said driving gear 17 to rotate to drive said first driven gear 16 to rotate, and said first driven gear 16 drives said first transmission shaft 15 to rotate to drive said driving rocker 33 to rotate; the rotation of said driving rocker 33 in the rocker mechanism 74 converts to the reciprocating swing motion at 120 degrees of said third driven rocker 32, which drives said oscillating rod 21 to swing to and fro at 120 degrees, which drives said discharging tube 25 to swing to and fro at 120 degrees, so that said first sprinkler 24 sprays water to and fro at 120 degrees from one side to the other side, thereby cleaning the upper surface of the workpiece.

Meanwhile, the water in said inlet tube 80 flows into said storage cavity 60 and is sprayed out through the second sprinkler 67; said driving gear 17 rotates to drive said second transmission shaft 50 to rotate to drive said rotating plate 64 and said sector gear 66 to rotate, and said sector gear 66 is rotated to drive said sliding box 59 in the rear side to slide towards two ends through meshing transmission with the racks 72 on the upper and lower walls of said gear cavity 62; Said first transmission shaft 15 rotates to drive said second driven gear 51 to rotate to drive said third driven gear 52 to rotate, and said third driven gear 52 rotates to drive said third transmission shaft 53 to rotate; said third transmission shaft 53 rotates to drive said first transmission pulley 56 to rotate to drive said second transmission pulley 63 to rotate through a first belt 75, which drives said fourth transmission shaft 57 to rotate to drive said rotating plate 64 and said sector gear 66 to rotate; after said sector gear 66 rotates, said sector gear 66 drives the front said sliding box 59 to slide towards two sides through meshing transmission with said racks 72, thereby cleaning the front and rear surfaces of the workpiece 26.

The benefits of the invention are as follows:

As the delivery device can be arranged in the assembly line when the device is installed, the first sprinklers above and below the workpiece in cleaning chamber may cyclically swing to clean the upper surface and the lower surface of the workpiece at 120 degrees, and the second sprinklers at the front and back side of the workpiece may move from one side to the other side to clean the front and back surfaces of the workpiece, which may clean the workpiece totally and rapidly, so that the workpiece machining time and the labor force are both saved;

In operation, said delivery device delivers a workpiece into said cleaning chamber, and said booster pump conveys pressurized water to said inlet tube and the water is sprayed out through said first sprinkler; said first motor drives said driving gear to rotate to drive said first driven gear to rotate, and said first driven gear drives said first transmission shaft to rotate to drive said driving rocker to rotate; the rotation of said driving rocker in the rocker mechanism converts to the reciprocating swing motion at 120 degrees of said third driven rocker, which drives said oscillating rod to swing to and fro at 120 degrees, which drives said discharging tube to swing to and fro at 120 degrees, so that said first sprinkler sprays water to and fro at 120 degrees from one side to the other side, thereby cleaning the upper surface of the workpiece, which improves the efficiency.

Meanwhile, the water in said inlet tube flows into said storage cavity and is sprayed out through the second sprinkler; said driving gear rotates to drive said second transmission shaft to rotate to drive said rotating plate and said sector gear to rotate, and said sector gear is rotated to drive said sliding box in the rear side to slide towards two ends through meshing transmission with the racks on the upper and lower walls of said gear cavity; Said first transmission shaft rotates to drive said second driven gear to rotate to drive said third driven gear to rotate, and said third driven gear rotates to drive said third transmission shaft to rotate; said third transmission shaft rotates to drive said first transmission pulley to rotate to drive said second transmission pulley to rotate through a first belt, which drives said fourth transmission shaft to rotate; said first transmission shaft drives said rotating plate and said sector gear to rotate, after said sector gear rotates, said sector gear drives the front said sliding box to slide towards two sides through meshing transmission with said racks, thereby cleaning the front and rear surfaces of the workpiece, which makes the workpiece cleaned in a short time.

This invention has a simple structure and is easy and convenient to use as the delivery device may be arranged in the assembly line, and the first sprinklers above and below the workpiece in cleaning chamber may cyclically swing to clean the upper surface and the lower surface of the workpiece at 120 degrees, and the second sprinklers at the front and back side of the workpiece may move from one side to the other side to clean the front and back surfaces of the workpiece, which may clean the workpiece totally and rapidly, so that the workpiece machining time and the labor force are both saved, and the machining is more automatic.

The basic principles, the main features and the advantages of the present invention are shown and described above. Persons skilled in the art should understand that, the invention is not subject to restrictions of the embodiments above, the embodiments and descriptions stated above only describe the principle of the present invention. The invention will be subject to modification and improvement based on its intention and extent, which will also fall into the claimed protection extent of this invention. The claimed protection extent of the invention shall be determined with reference to the appended claims.

The invention claimed is:
1. A workpiece cleaning device, comprising:
an all-in box,
a delivery device arranged in said all-in box,
wherein said all-in box is internally provided with a cleaning chamber penetrating from one side to the other side, and a front side of said cleaning chamber is provided with a water-supply cavity, and a rear side of said cleaning chamber is provided with a first transmission cavity, and front and rear inner walls of said cleaning chamber are respectively provided with sliding chutes which are up down symmetrical and extend horizontally, and the front and rear inner walls of said cleaning chamber are symmetrically provided with sliding boxes which are in sliding fit connection with said sliding chutes;
wherein gear cavities which are respectively close to the front and rear inner walls of said cleaning chamber are arranged in said sliding boxes, and upper and lower end walls of gear cavities are provided with racks,
wherein storage cavities are arranged in said gear cavities and away from the front and rear inner walls of said cleaning chamber,
wherein top walls of said storage cavities are provided with first through holes which are up-down through;
discharging tubes which are symmetrically disposed at an upper part and a lower part of the cleaning chamber are in rotational engagement with the front and rear inner walls of said cleaning chamber,
wherein front ends of said discharging tubes extends into said water-supply cavity;
second gearings symmetrically disposed at an upper part and a lower part of a front end wall of said first transmission cavity,
wherein said second gearings comprise second transmission box bodies which are internally provided with second transmission cavities;
wherein rear ends of said discharging tubes extend into said second transmission cavities, and outer sides of the rear end faces of said discharging tubes are fixedly provided with oscillating rods, rear ends of which are fixedly connected to rocker mechanisms which are located on bottom walls of said second transmission cavities;
first transmission shafts which extend symmetrically up and down towards a front and a back of said first transmission cavity,
wherein front ends of said first transmission shafts extend into said second transmission cavities and are rotationally connected to said rocker mechanisms, and rear ends of said first transmission shafts are in rotational engagement with a rear end wall of said first transmission cavity,
wherein each of said rocker mechanisms comprises a frame, a first side of which is provided with a driving rocker, a first end of which is rotationally connected to a respective one of said first transmission shafts,
wherein a second end of said driving rocker is rotationally connected with a first end of a first driven rocker, a turning of which is rotationally connected to a first end of a second driven rocker,
wherein a second end of said first driven rocker is rotationally connected with a first end of a third driven rocker, and a second end of said second driven rocker is rotationally connected in said frame, and a second end of said third driven rocker is rotationally connected in a middle end of a fourth driven rocker which is rotationally connected to a second side of said frame, wherein a front top of said third driven rocker is fixedly connected to a respective one of said oscillating rods;

first driven gears which are symmetrically arranged at an upper and a lower part of the first transmission cavity are fixedly connected to said first transmission shafts, wherein said first driven gears engage with a driving gear which is in power connection with a first motor which is on the rear end wall of said first transmission cavity;

a second transmission shaft fixedly connected to the center of a front end of said driving gear, wherein said second transmission shaft is rotationally connected to the front wall of said first transmission cavity and penetrates into a respective one of said gear cavities and is fixedly connected to a rotating plate, an outer circle of which is fixedly connected with a sector gear which is matched with said racks;

a second driven gear which is located in the front of a lower one of said first driven gears arranged in said first transmission cavity, wherein said second driven gear is fixedly connected to a respective one of said first transmission shafts, wherein a lower side of said second driven gear is provided with a third driven gear which is meshed with said second driven gear, wherein the center of a front side of said third driven gear is fixedly connected with a third transmission shaft which penetrates through and is rotationally connected to the front and rear inner walls of said cleaning chamber;

wherein a front end of said third transmission shaft extends into said water-supply cavity and is fixedly connected to a first pulley, and an upper side of the first pulley is connected to a second transmission pulley through a first belt, the center of a rear side of said second transmission pulley is fixedly connected with a fourth transmission shaft which penetrates through and is rotationally connected to a rear wall of said water-supply cavity, wherein a rear end of said fourth transmission shaft extends into a respective one of said gear cavities and is fixedly connected to said rotating plate;

wherein said first motor drives said driving gear to rotate to drive said first driven gears to rotate, and said first driven gears drive said first transmission shafts to rotate to drive said driving rocker to rotate;

wherein the rotation of said driving rocker converts to the reciprocating swing motion at 120 degrees of said third driven rocker, which drives said oscillating rods to swing to and fro at 120 degrees, which drives said discharging tubes to swing to and fro at 120 degrees, so that water is able to be sprayed to and fro at 120 degrees from one side to the other side, thereby cleaning an upper surface of a workpiece.

2. The workpiece cleaning device as defined in claim 1, wherein said delivery device comprises a driving pulley which is connected to a second motor which is arranged on a rear side of said driving pulley, one side of which is provided with a driven pulley which is connected to said driving pulley through a second belt; the delivery device delivers the workpiece into said cleaning chamber.

3. The workpiece cleaning device as defined in claim 1, wherein each of said discharging tubes is internally provided with a cavity, a front end of which is communicated with a respective one of said discharging tubes, wherein three first sprinklers penetrating through an inner wall of a front side of said cavity are evenly distributed in a middle section of said cavity, wherein a bottom end face of an upper one of said discharging tubes is provided with second through holes which are front and back symmetrical and communicated with an external space, and said second through holes are connected to said first through holes through flexible pipes;

wherein a front wall of said water-supply cavity is fixedly provided with a booster pump, wherein one end wall of said water-supply cavity is provided with a pipe hole penetrating towards two sides, wherein said pipe hole is internally provided with an inlet tube, two ends of which are respectively communicated with the external space and said booster pump;

wherein said cavity is connected with said booster pump through a water-supply flexible pipe;

wherein the booster pump delivers pressurized water into the inlet tube and the water is sprayed out through the three first sprinklers.

4. The workpiece cleaning device as defined in claim 3, wherein three second sprinklers are evenly formed on opposite inner walls of said storage cavities;

wherein the water in the inlet tube flows into the storage cavities and is sprayed out through the three second sprinklers.

\* \* \* \* \*